May 1, 1951 H. H. KLEMOLA 2,551,329
FILM TREATING APPARATUS
Filed Aug. 15, 1946 3 Sheets-Sheet 1
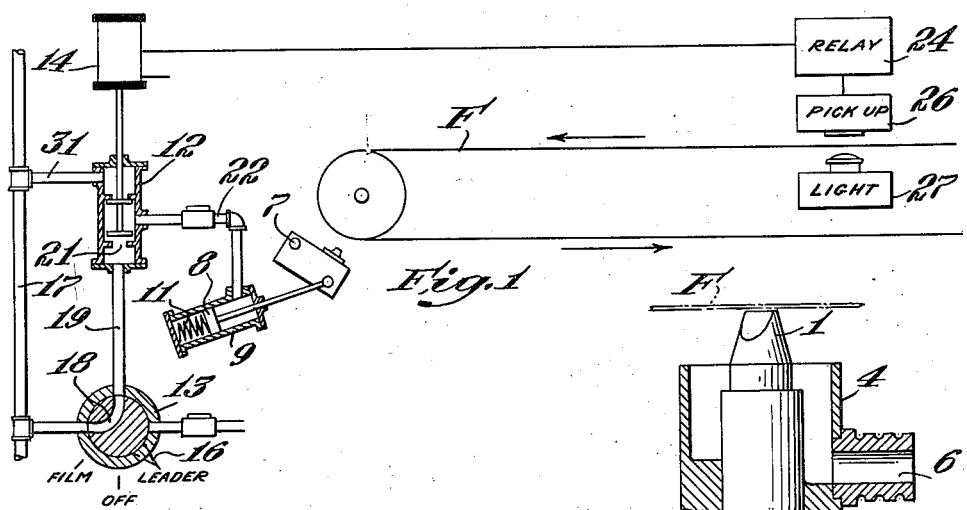
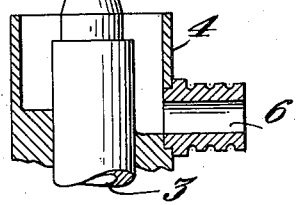
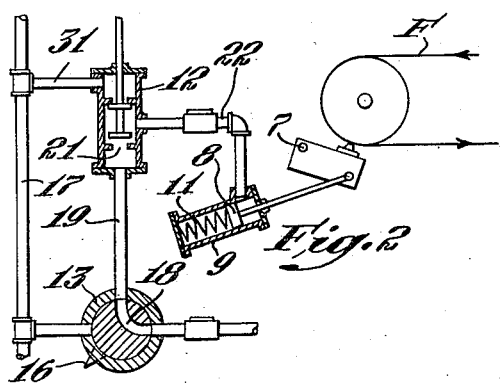
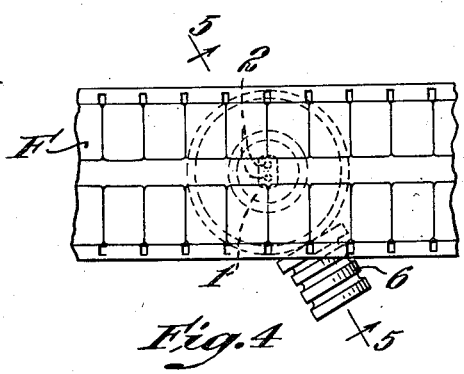
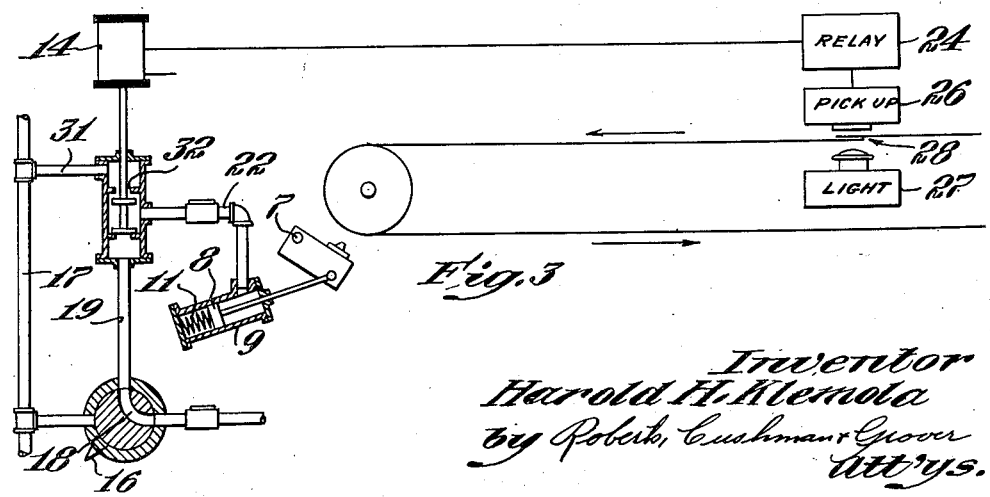
Inventor
Harold H. Klemola
by Roberts, Cushman & Grover
Att'ys.

May 1, 1951 H. H. KLEMOLA 2,551,329
FILM TREATING APPARATUS
Filed Aug. 15, 1946 3 Sheets-Sheet 2

INVENTOR
Harold H. Klemola
BY Roberts, Cushman & Grover
ATTORNEYS

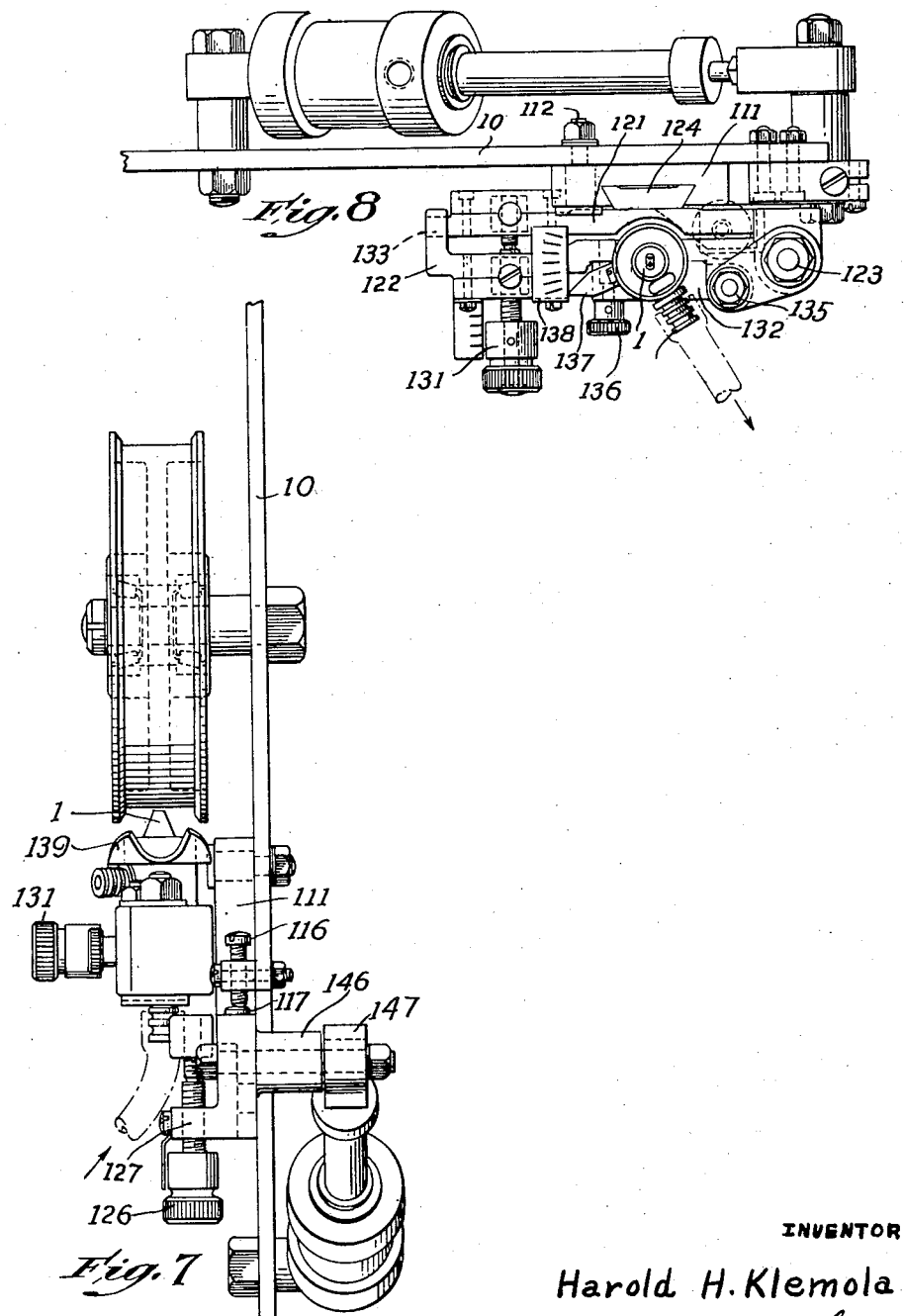

Patented May 1, 1951

2,551,329

UNITED STATES PATENT OFFICE 2,551,329

FILM TREATING APPARATUS

Harold H. Klemola, Los Angeles, Calif., assignor to Technicolor Motion Picture Corporation, Hollywood, Calif., a corporation of Maine Application August 15, 1946, Serial No. 690,772

3 Claims. (Cl. 91—12)

This invention relates to strip treating apparatus and more particularly to apparatus for applying a stripe of liquid to a longitudinal zone of cinematographic film, such as a stripe of sensitizing solution to the sound-track zone of film. In some cases the apparatus comprises a nozzle or other device extending into such close juxtaposition to the film that a film splice or other thick part of the film interferes with the operation of the device.

Objects of the invention are to avoid the aforesaid interference and to provide means for retracting the device which can be operated either manually or automatically, which returns the device accurately to operative position after a thick part of the strip has passed, and which is convenient and reliable in use.

According to the present invention the apparatus comprises means for guiding film along a predetermined path, film treating means extending into juxtaposition to the film at one location along the path, control means responsive to a change in thickness or light transmissivity of the film, and means responsive to the control means for regulating the treating means, the control means being located along the path in advance of the regulating means.

In the specific embodiment of the invention chosen for illustration the film treating means comprises a liquid bubbler extending into juxtaposition to the underside of the film for applying liquid to the film and the regulating means comprises means for retracting the bubbler away from the path of the film. Preferably the control means comprises a photo-electric device responsive to light transmitted through the film, so that a change in light transmissivity of the film operates the device, and also means to keep the treating means retracted until the thick part has passed the treating means. In the preferred embodiment the latter means comprises a slow-acting relay which keeps the control circuit closed for the necessary length of time. The apparatus may also comprise a controller having one position in which the treating means remains retracted, another position in which the treating means is retracted only in response to the aforesaid control means and another position in which the treating means is unresponsive to the control means.

For the purpose of illustration a typical embodiment of the invention is shown in the accompanying drawings in which Fig. 1 is a diagram showing the controller in the position where the film treating device remains retracted;

Fig. 2 is a similar view showing the controller in normal position where the film treating device extends into juxtaposition to the film.

Fig. 3 is a similar diagram showing the controller in the same position as in Fig. 2 but showing the film treating device retracted in response to the photo-electric control means;

Fig. 4 is an end view of a bubbler in operative relation to a piece of film which is shown in plan;

Fig. 5 is a section on line 5—5 of Fig. 4; and

Figs. 6, 7 and 8 are side, end and top views of the preferred bubbler and retracting mechanism.

Figure 6:
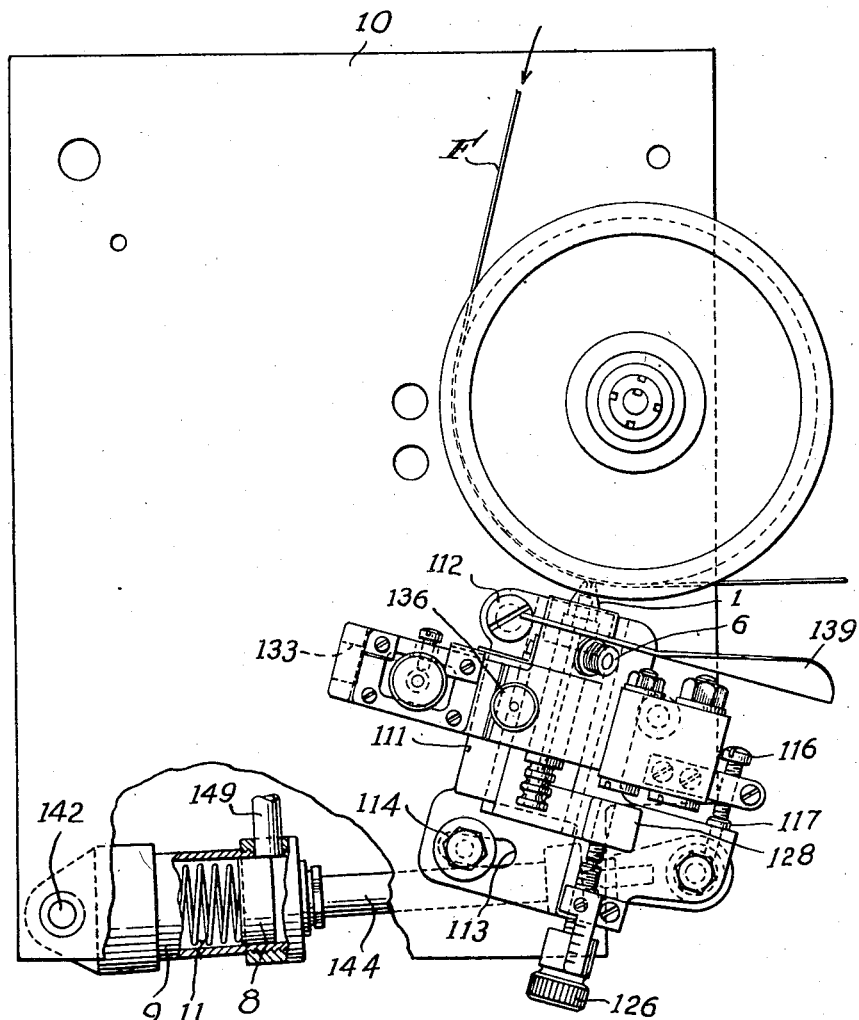

The particular embodiment of the invention shown for the purpose of illustration comprises apparatus for applying a stripe of sensitizing liquid to the sound-track zone of motion-picture film F which is 32 mm. wide and has perforations such as used in 16 mm. film so that, when split down the middle, it affords two standard 16 mm. films. As shown in Fig. 4 the sensitizing liquid is applied to the central zone of the film by means of a bubbler 1 having two orifices 2 on opposite sides of the center line of the film. Thus when the film is split it has a sensitized zone along each unperforated edge. As shown in Fig. 5 the bubbler 1 receives liquid through an axial duct 3 and is surrounded by a sleeve 4 to receive all of the liquid overflowing from the bubbler except the stripe of liquid which adheres to the film, the sleeve 4 having an outlet 6 through which the liquid returns to the supply reservoir to be recirculated. While the two orifices may apply separate stripes to the film, the pressure of the liquid is preferably sufficient to cause the two fountains to merge into one which rises high enough to deposit on the film a low ridge of liquid which covers substantially the entire soundtrack zone between the two rows of picture areas.

Referring to the diagrammatic illustrations in Figs. 1, 2 and 3 the bubbler 1 is shown as pivotally mounted at 7 to be swung from the operative position shown in Fig. 2 to the retracted position shown in Figs. 1 and 3. The bubbler is retracted by means of a piston 8 sliding in a cylinder 9 and is returned to operative position by means of a spring 11 in the cylinder. Compressed air or other fluid medium is supplied to the cylinder 9 through an electromagnetic valve 12 and a manual valve 13, the former being controlled by an electromagnet 14 and the latter having a pointer 16 movable to three positions marked Film, Off and Leader. The pointer 16 is moved to the Leader position while the leader film is passing the bubbler, whereby air is admitted through pipe 17, passage 18, pipe 19, port 21 of valve 12 and pipe 22 to retract the bubbler. When the pointer 16 is moved to the Film position, as shown in Fig. 2, air is exhausted from the cylinder 9 through the pipe 22, the port 21, pipe 19, passage 18 and exhaust pipe 23, thereby permitting the spring 11 to return the bubbler to operative position. When moved to the off position fluid can flow through the valve in neither direction.

The magnetic valve 14 is controlled through the medium of a time-delay relay 24 by a photoelectric cell 26 operated by light passing through the film from a source 27. When a splice, such as indicated at 28 in Fig. 3, or other opaque part passes across the light path, the beam of light from source 27 to cell 26 is interrupted, whereby the time-delay relay causes the magnetic valve to move from the upper position shown in Fig. 1 to the lower position shown in Fig. 3. Then air passes from pipe 17 through branch 31, port 32 of valve 12, pipe 22 and thence to cylinder 9, thereby retracting the bubbler. The parts are so designed and located that the bubbler is retracted before the splice reaches it and, by virtue of the time-delay relay, the bubbler remains retracted until the splice has passed it. Whereas Figs. 1, 2 and 3 show the bubbler and retracting mechanism diagrammatically, Figs. 6, 7 and 8 show the preferred mechanism in detail. As shown in these figures the mechanism for supporting the nozzle comprises a block 111 pivotally mounted on the back plate 10 by means of a bolt 112. The lower end of the block 111 has a slot 113 (Fig. 6) which is concentric with the pivot 112 and extending through the slot 113 is a bolt 114 fast to the back plate. To retract the nozzle from the film the block 111 is moved clockwise about the pivot 112 until the right end of slot 113 engages the bolt 114. Movement of the nozzle toward the film is limited by an adjustable stop 116 mounted on the back plate 10 to engage an abutment 117 on the lower end of the block 111.

The nozzle is supported on the block 111 through the medium of a support comprising a back part 121 and a front part 122 pivoted together at 123. The back part 121 is provided with a gib 124 slideable vertically in a dovetail guideway in block 111. The gib is adjustable in the guideway by means of a micrometer screw 126 threading through a lug 127 in the lower end of block 111 and thence in an arm 128. Thus the spacing between the end of the nozzle and the film may be adjusted approximately by means of the screw 116 and accurately by means of the micrometer screw 126.

Adjustment of the nozzle edgewise of the film is effected by means of a screw 131 threading through the front part 122 of the support and thence into the rear part 121. At the end opposite the pivot 123 the front part 122 is bifurcated to straddle a lug 133 on the back part 121 accurately to guide the movement of the front part 122 toward and from the back part 121.

The nozzle is clamped in the front part 122 of a clamp 132 pivoted at 135 and a screw 136. By loosening this screw the nozzle may be angularly adjusted about its own axis to align its two apertures transversely of the film. The nozzle is provided with a pointer 137 cooperating with a scale 138 to indicate its angular adjustment.

For the purpose of swinging the nozzle support clockwise about the pivot 112 from the operative position shown in Figs. 6, 7 and 8 to the retracted position wherein the right end of the slot 113 engages the bolt 114, the following mechanism is provided. The cylinder 9 is pivoted on the plate 10 at 142. Sliding in the cylinder is a piston 8 which is connected to the block 111 through a rod 144, an arm 146 and a connection 147 between the rod and arm. In the rear end of the cylinder 9 is a spring 11 which normally holds the parts in the operative position shown in the figures. When air or other fluid medium is introduced into the forward end of the cylinder through the inlet 149 the piston 8 is moved toward the rear of the cylinder to retract the nozzle support.

From the foregoing it will be evident that the present invention avoids interference with a bubbler or other film treating means juxtaposed to the path of the film by splices or other thick parts of the film, that the device may be retracted automatically by the photo-electric means or other suitable control means when the pointer 16 is in one position and, when the pointer is moved to another position, the device remains retracted indefinitely.

It should be understood that the present disclosure is for the purpose of illustration only and that this invention includes all modifications and equivalents which fall within the scope of the appended claims.

I claim:

1. Apparatus for treating a longitudinal zone of film which transmits light comprising means for guiding the film along a predetermined path, means for applying fluid to the film and normally disposed closely adjacent said film at one location along said path and movable away from the film to a retracted position, means normally holding the fluid applying means in said normally disposed position, operating means connected to said applying means for moving the applying means to said retracted position, control means including an element sensitive to light transmitted through the film and positioned at a location a substantial distance in advance of said first location, said element being disposed adjacent the film to receive light through the film, the control means being connected to said operating means to cause the operating means to move the applying means to said retracted position in response to change of light transmissivity of the film.

2. Apparatus according to claim 1 further characterized in that said applying means comprises a bubbler presented to the under side of the film as it travels along said path.

3. Apparatus for treating a longitudinal zone of film which transmits light comprising means for guiding the film along a predetermined path, means for applying fluid to the film and normally disposed closely adjacent said film at one location along said path and movable away from the film to a retracted position, means normally holding the fluid applying means in said normally disposed position, operating means connected to said applying means for moving the applying means to said retracted position, control means including an element sensitive to light transmitted through the film and positioned at a location a substantial distance in advance of said first location, said element being disposed adjacent the film to receive light through the film, the control means being connected to said operating means to cause the operating means to move the applying means to said retracted position in response to change of light transmissivity of the film, said control means comprising a controller having one position in which the applying means remains retracted and another position in which the retracting means is retracted in response to said light-sensitive means.

HAROLD H. KLEMOLA.

REFERENCES CITED

The following references are of record in the file of this patent:

UNITED STATES PATENTS

| Number | Name | Date |
|---|---|---|
| 1,378,304 | Wood | May 17, 1921 |
| 2,072,948 | Geffs | Mar. 9, 1937 |
| 2,192,833 | Johnson | Mar. 5, 1940 |
| 2,281,169 | Pattison | Apr. 28, 1942 |
| 2,342,203 | Kohler | Feb. 22, 1944 |
| 2,408,614 | Dimmick | Oct. 1, 1946 |
| 2,428,868 | Dimmick | Oct. 14, 1947 |